(12) United States Patent
Subrahmanyam

(10) Patent No.: US 6,826,003 B1
(45) Date of Patent: Nov. 30, 2004

(54) DISK DRIVE COMPRISING A PATTERN DEPENDENT OVERSHOOT CIRCUIT FOR CONTROLLING WRITE CURRENT OVERSHOOT

(75) Inventor: Jai N. Subrahmanyam, Santa Clara, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 485 days.

(21) Appl. No.: 10/062,963

(22) Filed: Jan. 31, 2002

(51) Int. Cl.[7] .............. G11B 5/02; G11B 5/09
(52) U.S. Cl. .............. 360/46; 360/67; 360/68; 360/45
(58) Field of Search .............. 360/68, 46, 67, 360/45; 327/110

(56) References Cited

U.S. PATENT DOCUMENTS 5,517,146 A    5/1996  Yamasaki
6,288,858 B1   9/2001  Arnett et al.
6,331,919 B1   12/2001 Klaassen et al.
2003/0234997 A1 * 12/2003 Ikekame et al. .............. 360/46

FOREIGN PATENT DOCUMENTS

WO    WO 01/29829 A1 *  4/2001  ............ G11B/5/02

* cited by examiner

*Primary Examiner*—Sinh Tran
*Assistant Examiner*—Dan I Davidson
(74) *Attorney, Agent, or Firm*—Milard G. Shara, Esq.; Howard H. Sheerin, Esq.

(57) ABSTRACT

A disk drive is disclosed comprising a disk and a head actuated radially over the disk. A pattern detector detects a predetermined pattern in write data to be written to the disk, and in response, adjusts a write current overshoot in a write current applied to the head.

24 Claims, 7 Drawing Sheets

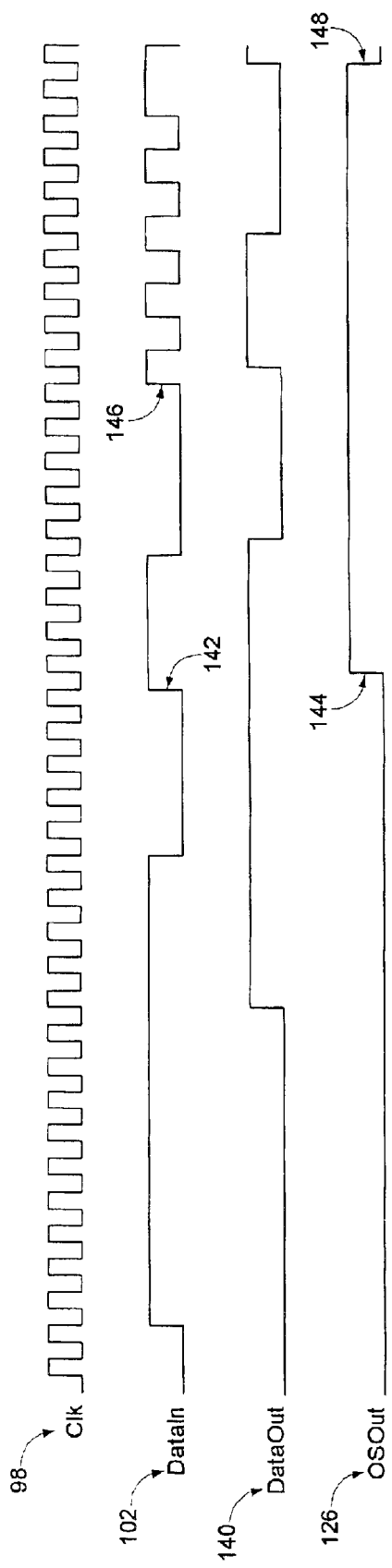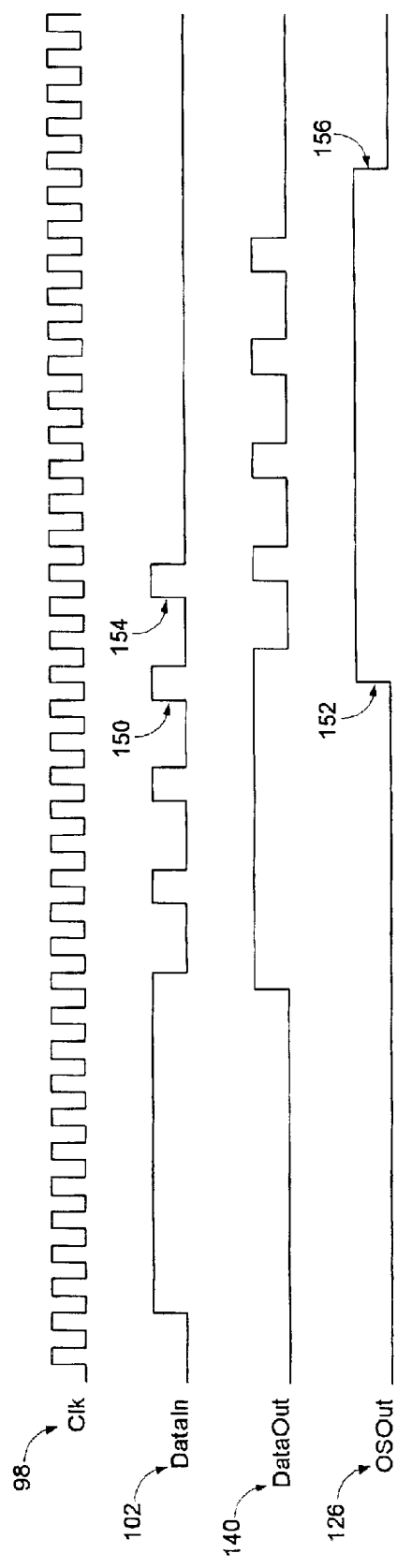

DISK DRIVE COMPRISING A PATTERN DEPENDENT OVERSHOOT CIRCUIT FOR CONTROLLING WRITE CURRENT OVERSHOOT

BACKGROUND OF THE INVENTION

1. Field of the Invention

The present invention relates to disk drives. More particularly, the present invention relates to a disk drive comprising a pattern dependent overshoot circuit for controlling write current overshoot.

2. Description of the Prior Art

Disk drives employ an inductive write element for writing magnetic transitions on the surface of a magnetizable disk. The digital data stream to be recorded modulates the current applied to the write element, for example, by reversing the direction of the current with each "1" bit. During a read operation, the magnetic transitions are detected by a read element (inductive or magnetoresistive), and the resulting read signal demodulated into an estimated data sequence representing the recorded data sequence.

A sufficient amount of current must be applied to the write element during the write ifs operation so that the resulting flux overcomes the coercivity of the disk. Conventional disk drives employ an overshoot circuit which controls the write current overshoot in the write element to ensure that after a present transition the write current reaches a peak value before the next transition. Conventional disk drives also employ a write-precompensation circuit which compensates for non-linearities due to closely spaced transitions referred to as non-linear bit shift.

FIG. 1 shows a prior art disk drive 2 comprising a write driver 4 responsive to write data 6 written to a disk 8 via a head 10. The head 10 is attached to a distal end of an actuator arm 12 which is rotated about a pivot by a voice coil motor in order to position the head 10 radially over the disk 8. The write data 6 modulates the current applied to the head 10 through the write driver 4. For example, a "0" bit in the write data 6 may modulate no change in the write current and a "1" bit may modulate a reversal in the write current. A current source 14 controls the magnitude of the write current (including a write current overshoot) generated by the write driver 4. The current source 14 is adjusted by an overshoot control register 16 and digital-to-analog converter (DAC) 18 in order to control the amount of write current overshoot. The overshoot control register 16 is loaded with a nominal value by a disk controller 20. The disk controller 20 receives user data from a host to be written to the disk 8, and performs appropriate encoding of the user data (e.g., error correction code (ECC) encoding) to generating write data 22. The write data 22 is shifted through a shift register 24 having taps applied to a pattern detector 26 and to a multiplexer 28. The pattern detector 26 identifies predetermined patterns in the write data 22 which require write-precompensation, and selects the appropriate delayed write data 6 via the multipexer 28. If write-precompensation is unnecessary, the pattern detector 26 selects the non-delayed write data 22 as the write data 6 applied to the write driver 4.

A problem with the prior art disk drive 2 of FIG. 1 is the difficulty in selecting a nominal value for the overshoot control register 16 which ensures sufficient write current overshoot while preventing inter-track interference due to excessive write current overshoot. This problem is exacerbated when a higher coercivity media is employed which exhibits lower media noise but requires more write current overshoot.

There is, therefore, a need to improve control over the write current overshoot in a disk drive to ensure adequate media saturation while preventing inter-track interference due to excessive write current overshoot.

SUMMARY OF THE INVENTION

The present invention may be regarded as a disk drive comprising a disk, and a head actuated radially over the disk. A disk controller receives user data from a host computer to be written to the disk, wherein the disk controller generates write data in response to the user data. A write driver generates a write current applied to the head in response to the write data and an overshoot control signal for controlling a write current overshoot in the write current. A pattern detector adjusts the overshoot control signal in response to a predetermined pattern detected in the write data.

In one embodiment, the write driver is implemented in a preamp integrated circuit and the pattern detector is implemented in a read/write channel integrated circuit. In an alternative embodiment, the write driver and pattern detector are implemented in a preamp integrated circuit.

In one embodiment, the pattern detector further generates a delay control signal for delaying the write data in response to the predetermined pattern detected in the write data to compensate for non-linear bit shift.

In one embodiment, the predetermined pattern detected in the write data corresponds to a high frequency pattern in the write current.

In one embodiment, the disk drive comprises an overshoot control register for storing a nominal overshoot value and an offset control register for storing an offset overshoot value. The nominal overshoot value is added to the offset overshoot value to generate the overshoot control signal.

The present invention may also be regarded as a pattern dependent overshoot circuit for controlling write current overshoot in a disk drive. The disk drive comprises a disk, a head actuated radially over the disk, and a disk controller for receiving user data from a host to be written to the disk, the disk controller for generating write data in response to the user data. The pattern dependent overshoot circuit comprises a write driver for generating a write current applied to the head in response to the write data and an overshoot control signal for controlling a write current overshoot in the write current. The pattern dependent overshoot circuit further comprises a pattern detector for adjusting the overshoot control signal in response to a predetermined pattern detected in the write data.

The present invention may also be regarded as a method of writing write data in a disk drive. The disk drive comprises a disk and a head actuated radially over the disk. A write current is modulated in response to the write data, and when a predetermined pattern is detected in the write data a write current overshoot in the write current is adjusted by an overshoot value to generate an adjusted write current. The adjusted write current is applied to the head.

In one embodiment, the method of writing data in a disk drive further comprises the step of delaying the write data by a delay period in response to the predetermined pattern detected in the write data to compensate for non-linear bit shift. In one embodiment, the overshoot value and the delay period are calibrated independently, and in an alternative embodiment they are calibrated dependently.

BRIEF DESCRIPTION OF THE DRAWINGS

FIG. 7A is a timing diagram illustrating operation of the programmable pattern detector of FIG. 6 wherein two consecutive occurrences of the predetermined pattern are detected and a special overshoot pattern selected for controlling the overshoot in the write current.

FIG. 7B is a timing diagram illustrating operation of the programmable pattern detector of FIG. 6 wherein two overlapping occurrences of the predetermined pattern are detected.

DESCRIPTION OF THE PREFERRED EMBODIMENTS

Figure 1:
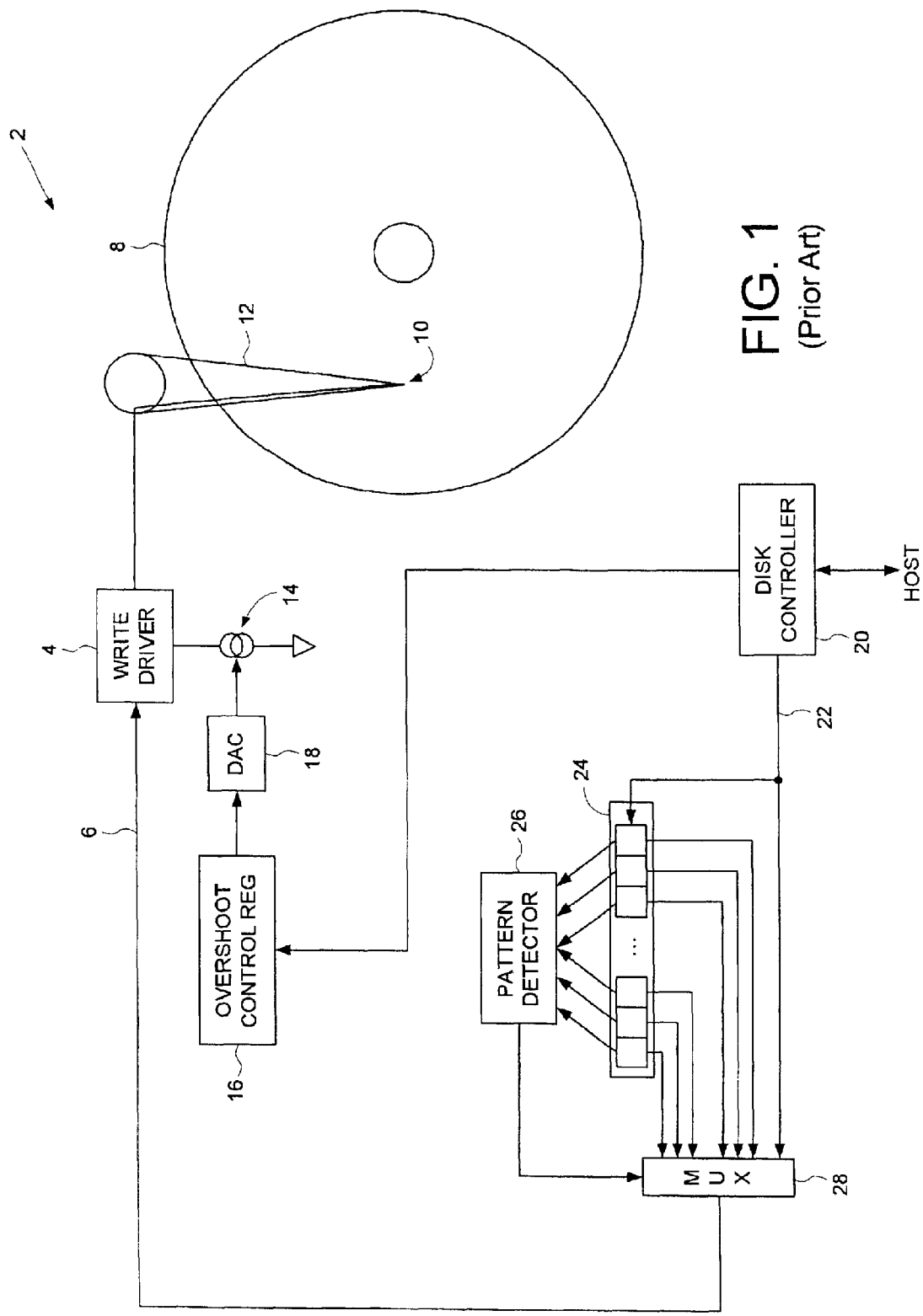
FIG. 1 shows a prior art disk drive comprising a pattern detector for delaying the write data to compensate for non-linear bit shift.
Figure 2:
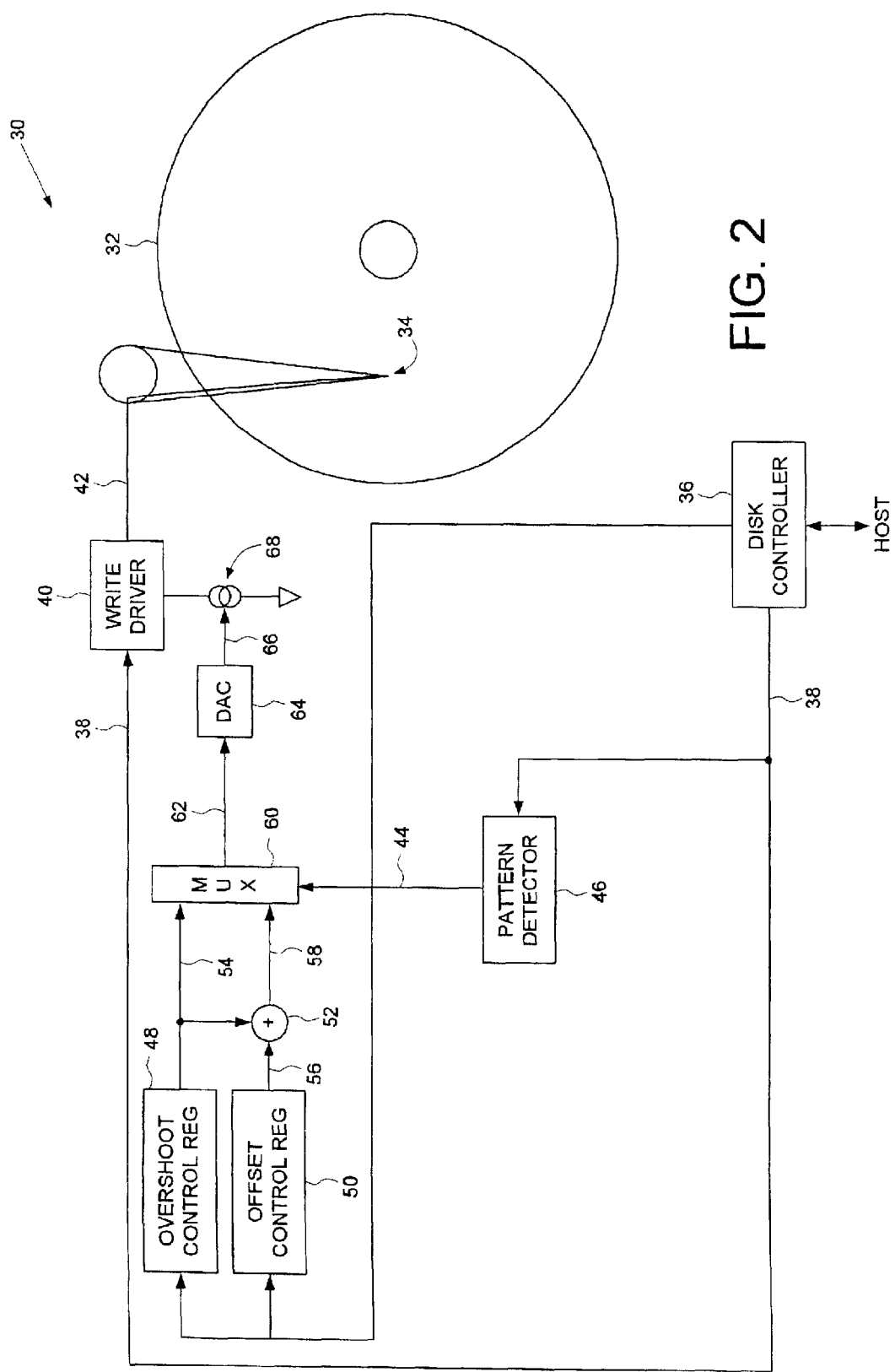
FIG. 2 a disk drive according to an embodiment of the present invention comprising a pattern detector for adjusting a write current overshoot in a write current applied to the head in response to a predetermined pattern detected in the write data.

FIG. 2 shows a disk drive 30 comprising a disk 32, and a head 34 actuated radially over the disk 32. A disk controller 36 receives user data from a host computer to be written to the disk 32, wherein the disk controller 36 generates write data 38 in response to the user data. A write driver 40 generates a write current 42 applied to the head 34 in response to the write data 38 and an overshoot control signal 44 for controlling a write current overshoot in the write current 42. A pattern detector 46 adjusts the overshoot control signal 44 in response to a predetermined pattern detected in the write data 38. In the embodiment of FIG. 2, the disk drive 30 comprises an overshoot control register 48 loaded by the disk controller 36 with a nominal overshoot value, and an offset control register 50 loaded by the disk controller 36 with an offset overshoot value. An adder 52 adds the nominal overshoot value 54 to the offset overshoot value 56 to generate an increased overshoot value 58 applied to a first input of a multiplexer 60. The nominal overshoot value 54 is applied to a second input of the multiplexer 60. If the pattern detector 46 detects the predetermined pattern in the write data 38, the overshoot control signal 44 selects the increased overshoot value 58 as the output 62 of the multiplexer 60. Otherwise, the overshoot control signal 44 selects the nominal overshoot value 54 as the output 62 of the multiplexer 60. A digital-to-analog converter (DAC) 64 converts the output 62 of the multiplexer 60 into an analog control signal 66 which adjusts a current source 68 for the write driver 40, thereby adjusting the overshoot write current in the write current 42 applied to the head 34.

The nominal overshoot value stored in the overshoot control register 48 and the offset overshoot value stored in the offset control register 50 may be determined for a family of disk drives, or they may be calibrated individually for each disk drive. A calibration routine implemented by the disk controller 20 may repeatedly write and read a test pattern or patterns to and from the disk to find the overshoot values which overcome the coercivity of the disk 8 without causing inter-track interference. In a disk drive employing zoned recording, overshoot values may be employed for each of the zones. When the head 10 crosses into a new zone, the disk controller 36 programs the overshoot control register 48 and the offset control register 50 with the corresponding overshoot values.

Figure 3:
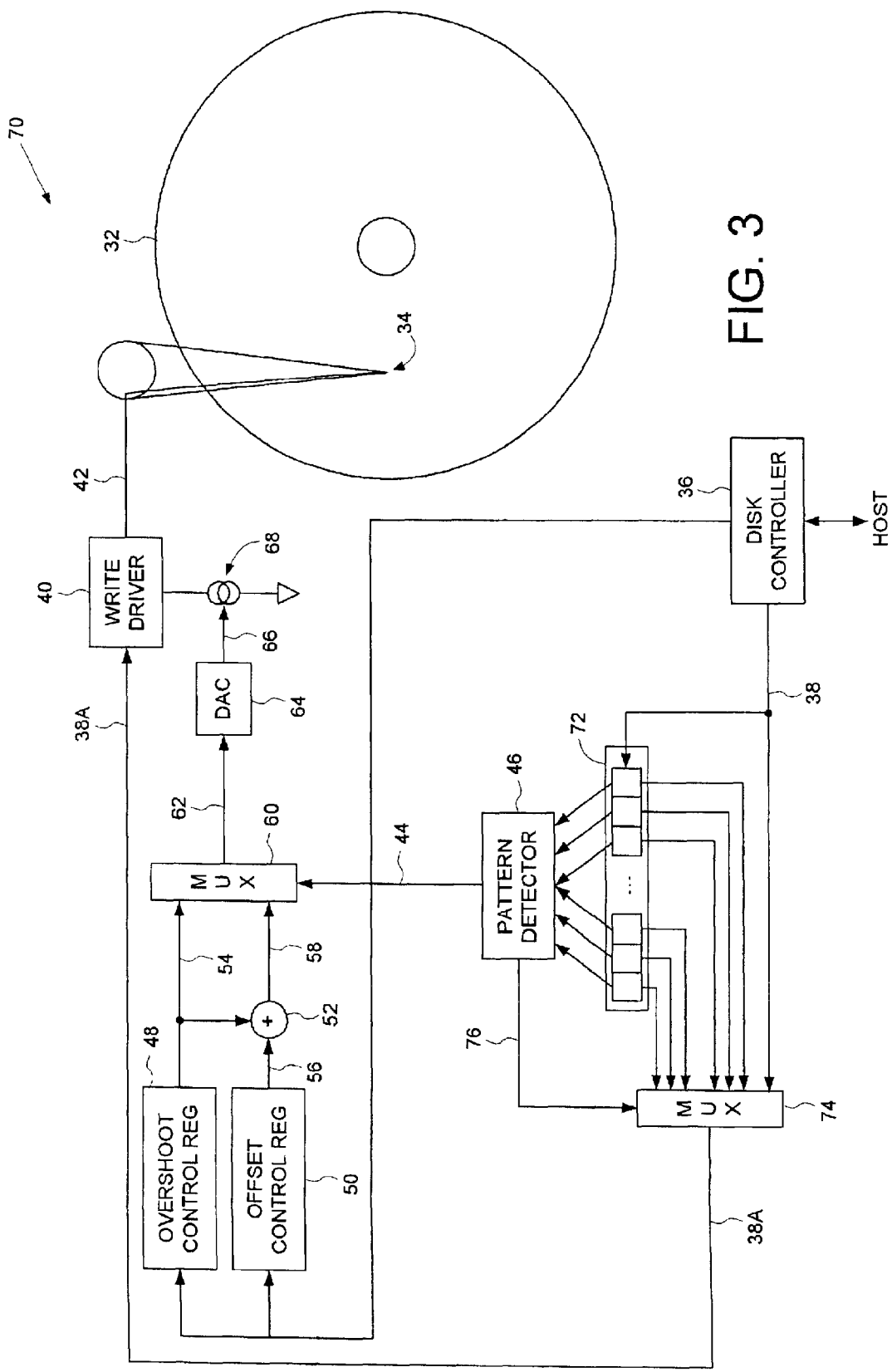
FIG. 3 shows a disk drive according to an embodiment of the present invention wherein the pattern detector delays the write data to compensate for non-linear bit shift when the predetermined pattern is detected.

FIG. 3 shows a disk drive 70 according to an embodiment of the present invention wherein the write data is shifted into a shift register 72. The pattern detector 46 compares each bit in the shift register 72 to the predetermined pattern (e.g., using a plurality of XOR gates). A tap from each bit in the shift register 72 is also applied to a multiplexer 74. The pattern detector 46 generates a control signal 76 for selecting either the non-delayed write data 38 or a delayed version as the write data 38A applied to the write driver 40. The delayed version is selected to compensate for non-linear bit shift when a predetermined pattern is detected in the write data 38. In one embodiment, the predetermined pattern which triggers an increase in the write current overshoot also triggers a delay in the write data 38 to compensate for non-linear bit shit.

In one embodiment, the write current overshoot value and the delay period are optimized during a calibration procedure for each zone of the disk. The calibration procedure may write a test pattern to the disk and adjust the overshoot value and delay period in a manner which minimizes a mean squared error in the read back sample values. In one embodiment, the overshoot value and delay period are calibrated independently, for example, by first calibrating the overshoot value and then calibrating the delay period. In an alternative embodiment, the overshoot value and delay period are calibrated dependently by adjusting both parameters together during the calibration procedure. Also during the calibration procedure, various patterns may be selected to determine which pattern or patterns require write current overshoot and/or a delay period. In one embodiment, the patterns in the write data 38 selected for calibration correspond to high frequency patterns in the write current 42.

Figure 4:
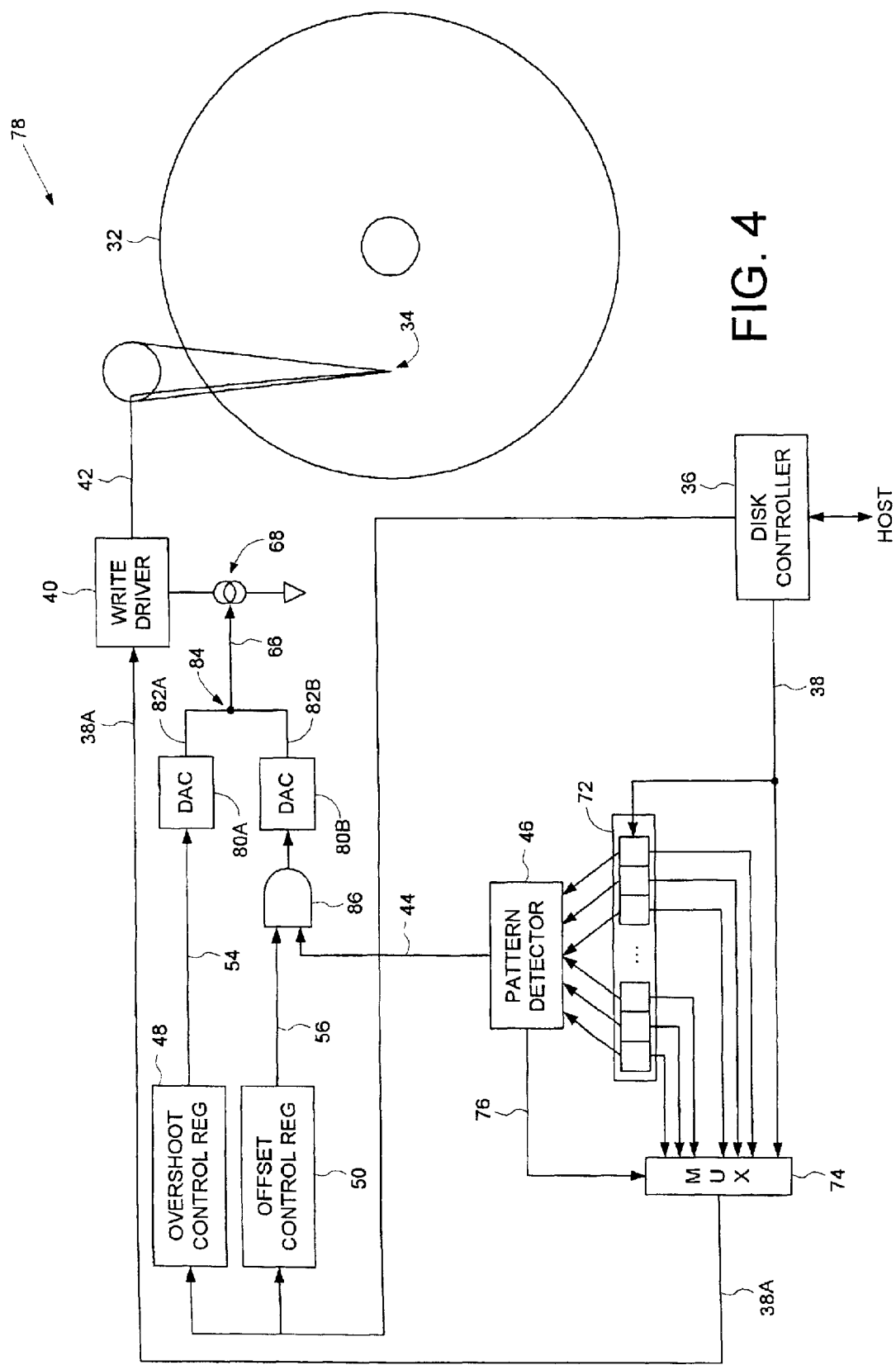
FIG. 4 shows a disk drive according to an embodiment of the present invention wherein a nominal overshoot value is added to an offset overshoot value in the analog domain to generate the overshoot control signal.

Any suitable technique for adjusting the write current overshoot in the write current 42 may be employed. FIG. 4 shows a disk drive 78 according to an embodiment of the present invention comprising a first DAC 80A for converting the nominal overshoot value 54 into a first analog signal 82A, and a second DAC 80B for converting the offset overshoot value 56 into a second analog signal 82B. The first and second analog signals 82A and 82B are summed at junction 84 to generate the control signal 66 applied to the current source 68. The overshoot control signal 44 applies the offset overshoot value 56 to the second DAC 80B via AND gate 86 when the predetermined pattern is detected in the write data 38.

The control signal 66 may alternatively control some other feature of the write driver 40 other than a current source 68 in order to adjust the write current overshoot in the write current 42. For example, in one embodiment the control signal 66 may control a voltage source. A suitable write driver for use in the embodiments of the present invention is disclosed in U.S. Pat. No. 6,331,919 which is incorporated herein by reference.

In one embodiment, the write driver 40 is implemented in a preamp integrated circuit and the pattern detector 46 is implemented in a read/write channel integrated circuit. A read/write channel typically performs appropriate encoding of the write data, for example, encoding according to a run-length-limited code constraint. The read/write channel also typically comprises suitable circuitry for demodulating the read signal into an estimated data sequence during a read operation. In an alternative embodiment, the write driver 40 and pattern detector 46 are implemented in a preamp integrated circuit. A preamp integrated circuit typically comprises driver circuitry for generating the write current 42 as well as amplifier circuitry for amplifying the read signal generated by the head 34 during read operations.

Figure 5:
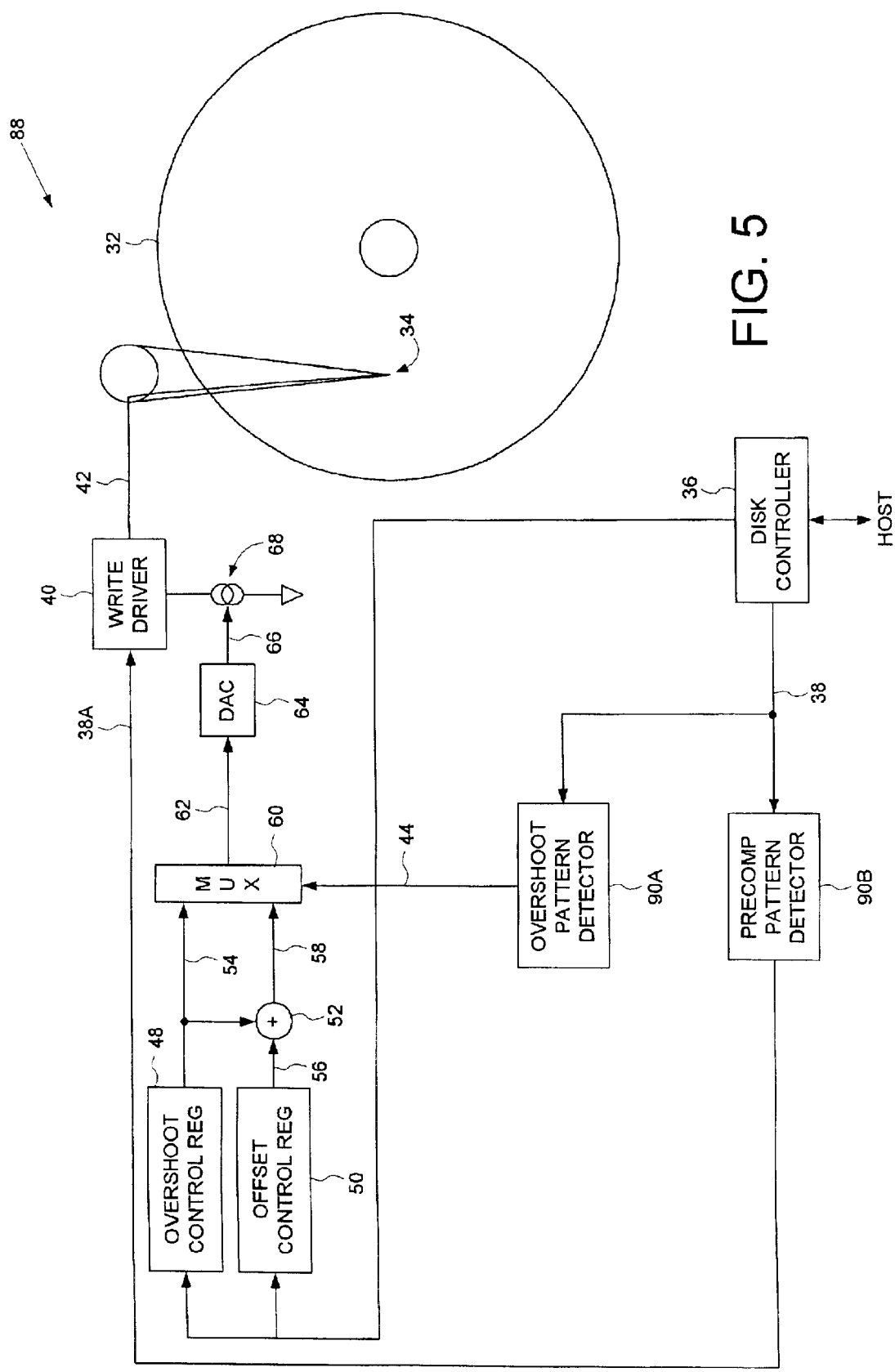
FIG. 5 shows a disk drive according to another embodiment of the present invention comprising a first pattern detector for performing write-precompensation an a second pattern detector for performing write current overshoot control.

FIG. 5 shows a disk drive 88 according to an embodiment of the present invention comprising a first pattern detector 90A for detecting a first predetermined pattern which requires an increase in the write current overshoot, and a second pattern detector 90B for detecting a second predetermined pattern which requires the write data 38 to be delayed to compensate for non-linear bit shift.

Figure 6:
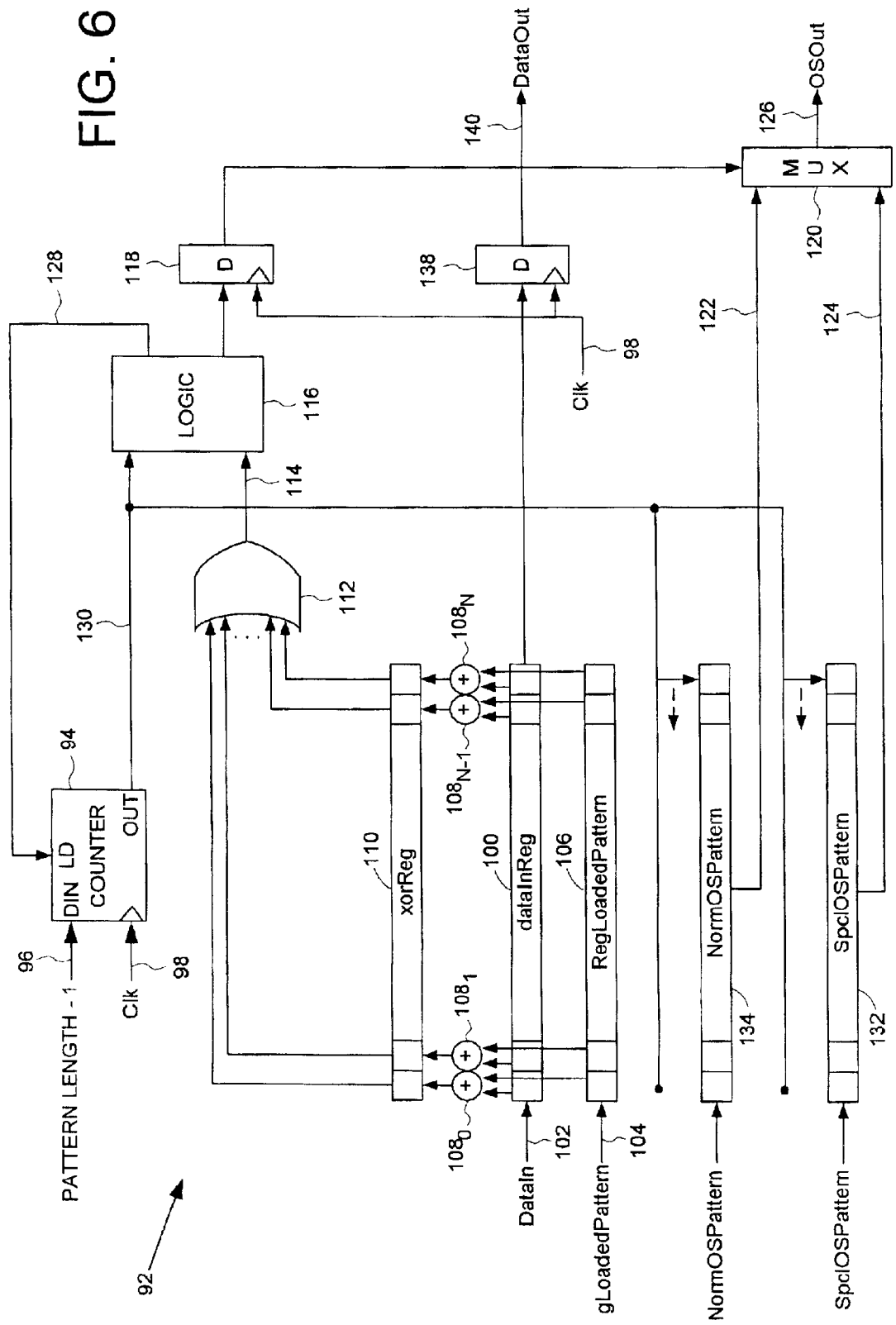
FIG. 6 shows a programmable pattern detector according to an embodiment of the present invention for detecting the predetermined pattern which requires an increase in the write current overshoot.

FIG. 6 shows a programmable pattern detector 92 according to an embodiment of the present invention for detecting the predetermined pattern which requires an increase in the write current overshoot. In this embodiment, the bit sequence as well as the length of the predetermined pattern are programmable. The operation of the programmable pattern detector 92 will be described with reference to FIG. 6, but it is also disclosed in the Verilog source code included in the appendix.

The programmable pattern detector 92 comprises a counter 94 which is loaded by a count value 96 equal to the length of the predetermined pattern minus one. The length of the predetermined pattern may be stored in a programmable register and loaded with any appropriate value. The counter 94 is decremented by a clock signal 98. The programmable pattern detector 92 further includes a shift register dataInReg 100 which receives a DataIn sequence 102 representing the write data to be written to the disk 32. The predetermined pattern 104 to be detected is loaded into a register RegLoadedPattern 106. The corresponding bits of the dataInReg 100 and the RegLoadedPattern 106 are XORed by XOR circuits $108_0$–$108_N$ and the result stored in register xorReg 110. Each bit of xorReg 110 is applied to an OR gate 112. If the output 114 of the OR gate 112 is low, the predetermined pattern has been detected in dataInReg 100. Logic circuitry 116 processes the output 114 of the OR gate 112 to control register 118. The output of register 118 selects via multiplexer 120 a normal over shoot pattern 122 or a special overshoot pattern 124. When the predetermined pattern is detected and the output of register 118 is set high, then multiplexer 120 selects the special overshoot pattern 124 as the OSOut signal 126. Otherwise, the multiplexer 120 selects the normal overshoot pattern 122 as the OSOut signal 126. In one embodiment, the OSOut signal 126 is the overshoot control signal in FIG. 3.

When the predetermined pattern is detected, the logic circuitry 116 generates a control signal 128 which loads the counter 94 with the count value 96 (pattern length minus one). The counter output 130 is then used to select the appropriate bit of the special overshoot pattern stored in register SpclOSPattern 132. That is, the counter output 130 selects the Nth bit of the special overshoot pattern on the first clock cycle, the N−1 bit of the special overshoot pattern on the next clock cycle, and so on. When the counter 94 reaches zero, the logic circuitry 116 resets register 118 so that the normal overshoot pattern 122 is selected by the multiplexer 120. The counter 94 is also reloaded with the count value 96 via control signal 128 when the counter 94 reaches zero. If the predetermined pattern is detected again before the counter 94 reaches zero, the counter 94 is reloaded with the count value 96 via control signal 128. In this manner, overlapping occurrences of the predetermined pattern are detected correctly. The counter output 130 also selects the appropriate bit of the normal overshoot pattern stored in register NormOSPattern 134. If the predetermined pattern has not been detected, then the normal overshoot pattern 122 is selected by the multiplexer 120. The write data is sifted out of dataInReg 100 and delayed by register 138 in order to synchronize the write data with the OSOut signal 126. That is, each bit of the OSOut signal 126 corresponds to the overshoot in the write current for each bit in the DataOut signal 140.

FIG. 7A is a timing diagram illustrating operation of the programmable pattern detector 92 of FIG. 6 wherein two consecutive occurrences of the predetermined pattern are detected in the write data. In this example, the predetermined pattern comprises nine bits: "111100000". The normal overshoot pattern loaded into register NormOSPattern 134 comprises nine "0" bits, and the special overshoot pattern loaded into register SpclOSPattern 132 comprises nine "1" bits. At time 142 the predetermined pattern is detected in DataIn 102 and the special overshoot pattern 124 is selected as the overshoot control signal OSOut 126 for nine clock cycles by loading the is counter 94 with the count value 96 at time 144. At the end of the nine clock cycles at time 146 the predetermined pattern is again detected in DataIn 102 and the special overshoot pattern 124 is again selected as the overshoot control signal OSOut 126 for another nine clock cycles by reloading the counter 94 with the count value 96. At time 148 the second predetermined pattern ends in DataOut 140 and the normal overshoot pattern 122 is selected as the overshoot control signal OSOut 126.

FIG. 7B is a timing diagram illustrating operation of the programmable pattern detector 92 of FIG. 6 wherein two overlapping occurrences of the predetermined pattern are detected. In this example, the predetermined pattern comprises nine bits "100100100". The normal overshoot pattern loaded into register NormOSPattern 134 comprises nine "0" bits, and the special overshoot pattern loaded into register SpclOSPattern 132 comprises nine "1" bits. At time 150 the predetermined pattern is detected in DataIn 102 and the special overshoot pattern 124 is selected as the overshoot control signal OSOut 126 for nine clock cycles by loading the counter 94 with the count value 96 at time 152. At time 154 a second overlapping occurrence of the predetermined pattern is detected and the counter 94 is reset by reloading the counter 94 with the count value 96. At time 156 the second occurrence of the predetermined pattern ends in DataOut 140 and the normal overshoot pattern 122 is selected as the overshoot control signal OSOut 126.

APPENDIX

```
module selector (OSOut, DataOut, regLoadedPattern, NormOSPattern,
SpclOSPattern, DataIn, Clk, Reset);
`define PATWIDTH 9;
parameter buswidth = 9;
output OSOut;
output DataOut;
input [buswidth−1:0] regLoadedPattern;
input [buswidth−1:0] NormOSPattern;
input [buswidth−1:0] SpclOSPattern;
input DataIn;
inout Clk;
input Reset;
```

APPENDIX-continued

```
reg [buswidth-1:0] dataInReg;
reg [buswidth-1:0] counter;
reg RegOut;
reg DataOut;
reg [buswidth-1:0] xorReg;
wire OrXorReg;
//The following always block implements the xorReg.
always @ (Reset or dataInReg)
begin
   if (!Reset)
      xorReg = 9'b0;
   else
      xorReg = dataInReg[buswidth-1:0] ^ regLoadedPattern[buswidth-1:0];
end
//The following always block implements the counter.
always @ (negedge Reset or posedge Clk)
begin
   if (!Reset)
      counter <= 9'd8;
   else
      if (!counter || !OrXorReg)
         counter <= 9'd8;
      else
         counter <= counter - 1'b1;
end
//The following always block implements the dataInReg.
always @ (negedge Reset or posedge Clk)
begin
   if (!Reset)
      dataInReg <= 9'b0;
   else
      dataInReg[buswidth-1:0] <= {DataIn, dataInReg[buswidth-1:1]};
end
always @ (negedge Reset or posedge Clk)
begin
   if(!Reset)
      DataOut <= 1'b0;
   else
      DataOut <= dataInReg[0];
end
always @ (posedge Clk or negedge Reset)
begin
   if(!Reset)
      RegOut <= 1'b0;
   else
      begin
         if (OrXorReg == 0)
            begin
               RegOut <= 1'b1;
            end
         else
            begin
               if (!counter)
                  RegOut <= 1'b0;
            end
      end
end
assign OSOut = (RegOut==0)?  NormOSPattern[buswidth-1-counter]
                           : SpclOSPattern[buswidth-1-counter];
//This is a temp variable. So will go away during synthesis
assign OrXorReg = |xorReg;
endmodule
module testbench ( );
parameter PATWIDTH = 9;
parameter INPAT = 9'b000001111;
parameter NormOS = 9'b000000000;
parameter SpclOS = 9'b111111111;
wire OSOut;
wire DataOut;
reg [PATWIDTH-1:0] regLoadedPattern;
reg [PATWIDTH-1:0] NormOSPattern;
reg [PATWIDTH-1:0] SpclOSPattern;
reg Data;
reg Clk;
reg Reset;
reg [PATWIDTH-1:0] PAT1;
reg [PATWIDTH-1:0] PAT2;
reg [PATWIDTH-1:0] PAT3;
integer i;
```

APPENDIX-continued

```
initial
begin
   $dumpfile ("myFile.vcd");
   $dumpvars;
end
initial
begin
   Reset = 1'b0;
   Clk = 1'b0;
   Data = 1'b0;
   regLoadedPattern = INPAT;
   NormOSPattern = NormOS;
   SpclOSPattern = SpclOS;
   PAT1 = 9'b111111111;
   PAT2 = 9'b000001111;
   PAT3 = 9'b101010101;
   #40 Reset = 1'b1;
   # 30;
   for (i=0; i<9; i=i+1)
   begin
      @ (negedge Clk) Data = PAT1[i];
   end
   for (i=0; i<9; i=i+1)
   begin
      @ (negedge Clk) Data = PAT1[i];
   end
   for (i=0; i<9; i=i+1)
   begin
      @ (negedge Clk) Data = PAT2[i];
   end
   for (i=0; i<9; i=i+1)
   begin
      @ (negedge Clk) Data = PAT2[i];
   end
   for (i=0; i<9; i=i+1)
   begin
      @ (negedge Clk) Data = PAT3[i];
   end
   for (i=0; i<9; i=i+1)
   begin
      @ (negedge Clk) Data = PAT3[i];
   end
   #500 $finish;
end
always
begin
   #10 Clk = ~Clk;
end
selector s1 (OSOut, DataOut, regLoadedPattern, NormOSPattern,
SpclOSPattern, Data, Clk, Reset);
endmodule
```

I claim:

1. A disk drive comprising:

(a) a disk;

(b) a head actuated radially over the disk, (c) a disk controller for receiving user data from a host to be written to the disk, the disk controller for generating write data in response to the user data;

(d) a write driver for generating a write current applied to the head in response to the write data and an overshoot control signal for controlling a write current overshoot in the write current; and (e) a pattern detector for adjusting the overshoot control signal in response to a predetermined pattern detected in the write data.

2. The disk drive as recited in claim 1, wherein the write driver is implemented in a preamp integrated circuit and the pattern detector is implemented in a read/write channel integrated circuit.

3. The disk drive as recited in claim 1, wherein the write driver and pattern detector are implemented in a preamp integrated circuit.

4. The disk drive as recited in claim 1, wherein the pattern detector further generates a delay control signal for delaying the write data in response to the predetermined pattern detected in the write data to compensate for non-linear bit shift.

5. The disk drive as recited in claim 1, wherein the predetermined pattern detected in the write data corresponds to a high frequency pattern in the write current.

6. The disk drive as recited in claim 1, further comprising:
 (a) an overshoot control register for storing a nominal overshoot value;
 (b) an offset control register for storing an offset overshoot value; and
 (c) an adder for adding the nominal overshoot value to the offset overshoot value to generate the overshoot control signal.

7. The disk drive as recited in claim 6, wherein the adder comprises a digital adder.

8. The disk drive as recited in claim 6, wherein the adder comprises an analog adder.

9. A pattern dependent overshoot circuit for controlling write current over shoot in a disk drive, the disk drive comprising a disk, a head actuated radially over the disk, and a disk controller for receiving user data from a host to be written to the disk, the disk controller for generating write data in response to the user data, the pattern dependent overshoot circuit comprising:
 (a) a write driver for generating a write current applied to the head in response to the write data and an overshoot control signal for controlling a write current overshoot in the write current; and
 (b) a pattern detector for adjusting the overshoot control signal in response to a predetermined pattern detected in the write data.

10. The pattern dependent overshoot circuit as recited in claim 9, wherein the write driver is implemented in a preamp integrated circuit and the pattern detector is implemented in a read/write channel integrated circuit.

11. The pattern dependent overshoot circuit as recited in claim 9, wherein the write driver and pattern detector are implemented in a preamp integrated circuit.

12. The pattern dependent overshoot circuit as recited in claim 9, wherein the pattern detector further generates a delay control signal for delaying the write data in response to the predetermined pattern detected in the write data to compensate for non-linear bit shift.

13. The pattern dependent overshoot circuit as recited in claim 9, wherein the predetermined pattern detected in the write data corresponds to a high frequency pattern in the write current.

14. The pattern dependent overshoot circuit as recited in claim 9, further comprising:
 (a) an overshoot control register for storing a nominal overshoot value;
 (b) an offset control register for storing an offset overshoot value; and
 (c) an adder for adding the nominal overshoot value to the offset overshoot value to generate the overshoot control signal.

15. The pattern dependent overshoot circuit as recited in claim 14, wherein the adder comprises a digital adder.

16. The pattern dependent overshoot circuit as recited in claim 14, wherein the adder comprises an analog adder.

17. A method of writing write data in a disk drive, the disk drive comprising a disk and a head actuated radially over the disk, the method comprising the steps of:
 (a) modulating a write current in response to the write data;
 (b) detecting a predetermined pattern in the write data,
 (c) when the predetermined pattern is detected, adjusting a write current overshoot in the write current by an overshoot value to generate an adjusted write current; and
 (d) applying the adjusted write current to the head.

18. The method as recited in claim 17, further comprising the step of delaying the write data by a delay period in response to the predetermined pattern detected in the write data to compensate for non-linear bit shift.

19. The method as recited in claim 18, further comprising the step of calibrating the overshoot value and the delay period independently.

20. The method as recited in claim 18, further comprising the step of calibrating the overshoot value and the delay period dependently.

21. The method as recited in claim 17, wherein the predetermined pattern detected in the write data corresponds to a high frequency pattern in the write current.

22. The method as recited in claim 17, further comprising the step of adding a nominal overshoot value to an offset overshoot value to generate the overshoot control signal.

23. The method as recited in claim 22, wherein the adding step is performed in the digital domain.

24. The method as recited in claim 22, wherein the adding step is performed in the analog domain.

* * * * *